United States Patent [19]

Shibayama et al.

[11] Patent Number: 5,465,616
[45] Date of Patent: Nov. 14, 1995

[54] METHOD OF INSPECTING VARIOUS CONTROL FUNCTIONS OF A MOTORCAR

[75] Inventors: Takao Shibayama; Keiichiro Maekawa, both of Sayama, Japan

[73] Assignee: Honda Giken Kogyo Kabushiki Kaisha, Tokyo, Japan

[21] Appl. No.: 347,178

[22] Filed: Nov. 22, 1994

Related U.S. Application Data

[63] Continuation of Ser. No. 1,292, Jan. 6, 1993, abandoned.

[30] Foreign Application Priority Data

Feb. 28, 1992 [JP] Japan ................................. 4-043997

[51] Int. Cl.$^6$ ................................................. G01M 15/00
[52] U.S. Cl. ............................................................. 73/118.1
[58] Field of Search ....................................... 73/117, 118.1, 73/162, 121, 124, 125

[56] References Cited

U.S. PATENT DOCUMENTS

| | | |
|---|---|---|
| 3,979,950 | 9/1976 | Maxwell . |
| 4,055,996 | 11/1977 | Dinkelacker et al. ................... 73/117 |
| 4,158,961 | 6/1979 | Ben-David ................................. 73/117 |
| 4,848,142 | 7/1989 | Fujimori et al. . |
| 4,986,114 | 1/1991 | Rothmann et al. . |

FOREIGN PATENT DOCUMENTS

| | | |
|---|---|---|
| 367329A1 | 5/1990 | European Pat. Off. . |
| 0433668A | 6/1991 | European Pat. Off. . |
| 63-84544 | 6/1988 | Japan . |
| 1-214731 | 8/1989 | Japan . |
| 1-191031 | 8/1989 | Japan . |
| 1-233124 | 9/1989 | Japan . |
| 3-42544 | 2/1991 | Japan . |
| 1082141 | 9/1967 | United Kingdom . |
| 1501208 | 2/1978 | United Kingdom . |

*Primary Examiner*—R. Raevis
*Attorney, Agent, or Firm*—Armstrong, Westerman, Hattori, McLeland & Naughton

[57] ABSTRACT

A plurality of control functions of a motorcar are inspected by grouping the control functions into a first group having a function of accelerating at least one wheel and a second group having a function of decelerating at least one wheel. The inspection of the control functions which belong to the first group is carried out during a process of accelerating the motorcar and the inspection of the control functions which belong to the second group is carried out in a process of decelerating the motorcar.

3 Claims, 4 Drawing Sheets

METHOD OF INSPECTING VARIOUS CONTROL FUNCTIONS OF A MOTORCAR

This application is a continuation of application Ser. No. 08/001,292 filed Jan. 6, 1993, now abandoned.

BACKGROUND OF THE INVENTION

The present invention relates to a method of inspecting various control functions of a differential apparatus with a limited slip differential mechanism, a traction control system, an anti-lock brake system (or anti-wheel-lock brake system) and the like of a motorcar.

Conventionally, there is known, in Japanese Published Unexamined Utility Model Registration Application No. 84544/1988, a method of inspecting various control functions of a differential apparatus with a limited slip differential mechanism, a traction control system, an anti-lock brake system and the like of a motorcar by using an inspecting apparatus which is provided with rolls for mounting thereon respective wheels of the motorcar.

This conventional method is arranged as follows. A judgement whether or not the differential apparatus with the limited slip differential mechanism is acceptable is made in the following manner, i.e., a starting and accelerating operation is performed in a condition in which a roll for mounting thereon one of the right and left driving wheels is braked, to see whether or not a value of increase in the rotational speed of the other of the driving wheels within a predetermined time falls within a predetermined set value which is defined by the limited slip differential mechanism. A judgement whether or not the traction control system is acceptable is made in the following manner, i.e., a starting and accelerating operation is performed in a condition in which the rolls for mounting thereon the driven wheels are stopped, to see whether or not a value of increase in the rotational speed of the driving wheels within a predetermined time falls within a set value which is defined by the traction control system. Further, in the inspection of the anti-lock brake system, each of the wheels is rotated on each of the rolls and, when the rotational speed of the wheels has reached a predetermined speed, each of the rolls is made to be independently rotatable. A judgement whether or not the anti-lock brake system is acceptable is then made in the following manner, i.e., a brake is applied in the above-described condition to see whether or not the braking time required to decelerate each of the wheels from a predetermined upper limit speed down to a predetermined lower limit speed falls within an allowable range.

In the above-described method, when the inspection of the differential apparatus with the limited slip differential mechanism has been finished by the starting and accelerating operation, the motorcar must be once returned to a stopped condition and then started and accelerated again to perform the inspection of the traction control system. It has therefore a disadvantage in that the inspection is time-consuming.

By the way, the differential apparatus with the limited slip differential mechanism functions to operate in the following manner. Namely, when one of the wheels races or slips, the driving force is distributed to the other of the wheels so that the difference in the rotational speeds of both wheels falls within a predetermined range. The apparatus thus has a function of accelerating at least one of the wheels.

The traction control system, on the other hand, functions to operate in the following manner. Namely, a ratio of slippage of the driving wheels is calculated based on the difference in rotational speeds between the driving wheels and the driven wheels and, when the ratio of slippage has increased, the output of the engine is controlled to decelerate the driving wheels.

OBJECT AND SUMMARY OF THE INVENTION

Taking note of the fact that various control functions of a motorcar can be grouped into those which perform the accelerating functions and those which perform the decelerating functions, the present invention has an object of providing a method of inspection in which the various control functions can be effectively and continuously inspected during the time from starting to stopping of the motorcar.

According to the present invention, for achieving the foregoing object, the method of inspecting a plurality of control functions of a motorcar, the control functions of which are grouped into a first group having a function of accelerating at least one wheel and a second group having a function of decelerating at least one wheel, comprises the steps of inspecting a control function which belongs to the first group during a process of accelerating the motorcar, and inspecting a control function which belongs to the second group in a succeeding process of decelerating the motorcar.

In case the control functions to be inspected are a differential apparatus with a limited slip differential mechanism (hereinafter called LSD), a traction control system and an anti-lock brake system, the LSD belongs to the first group which performs the accelerating function and the traction control system and the anti-lock brake system belong to the second group which performs the decelerating function. It follows that the LSD is inspected during the process of accelerating the motorcar and the traction control system and the anti-lock brake system are inspected during the process of decelerating the motorcar.

In case the LSD, the traction control system, and the anti-lock brake system are inspected in a condition in which the motorcar is driven while each of wheels of the motorcar is mounted on each of rolls provided in an inspecting apparatus, the LSD is inspected in an accelerating process of starting and accelerating operation of the motorcar by simulating operating conditions of the LSD. Preferably, the simulating operating conditions is done by applying a braking force to a roll for one of the driving wheels. Thus, the LSD is inspected whether it is acceptable or not based on the acceleration degree or the like of the other of the driving wheels. Then, at a time when a set speed has been reached, the traction control system is inspected by simulating operating conditions of the traction control system to see whether or not the traction control system is acceptable. Preferably, this inspection is based on the deceleration degree or the like of the driving wheels by, e.g., decelerating the rolls for the driven wheels. Thereafter, the anti-lock brake system is inspected by operating a brake of the motorcar.

By thus carrying out the inspection of the control functions of the LSD and the like which belongs to the first group during the accelerating process of the motorcar and then performing the inspection of the control functions of the traction control system, anti-lock brake system or the like which belong to the second group during the decelerating process of the motorcar, various kinds of control functions can be effectively and continuously performed during the time from the start to the stop of the motorcar.

BRIEF DESCRIPTION OF THE DRAWINGS

The above and other objects and the attendant advantages of the present invention will become readily apparent by reference to the following detailed description when considered in conjunction with the accompanied drawings wherein.

DETAILED DESCRIPTION OF PREFERRED EMBODIMENTS

Figure 1:
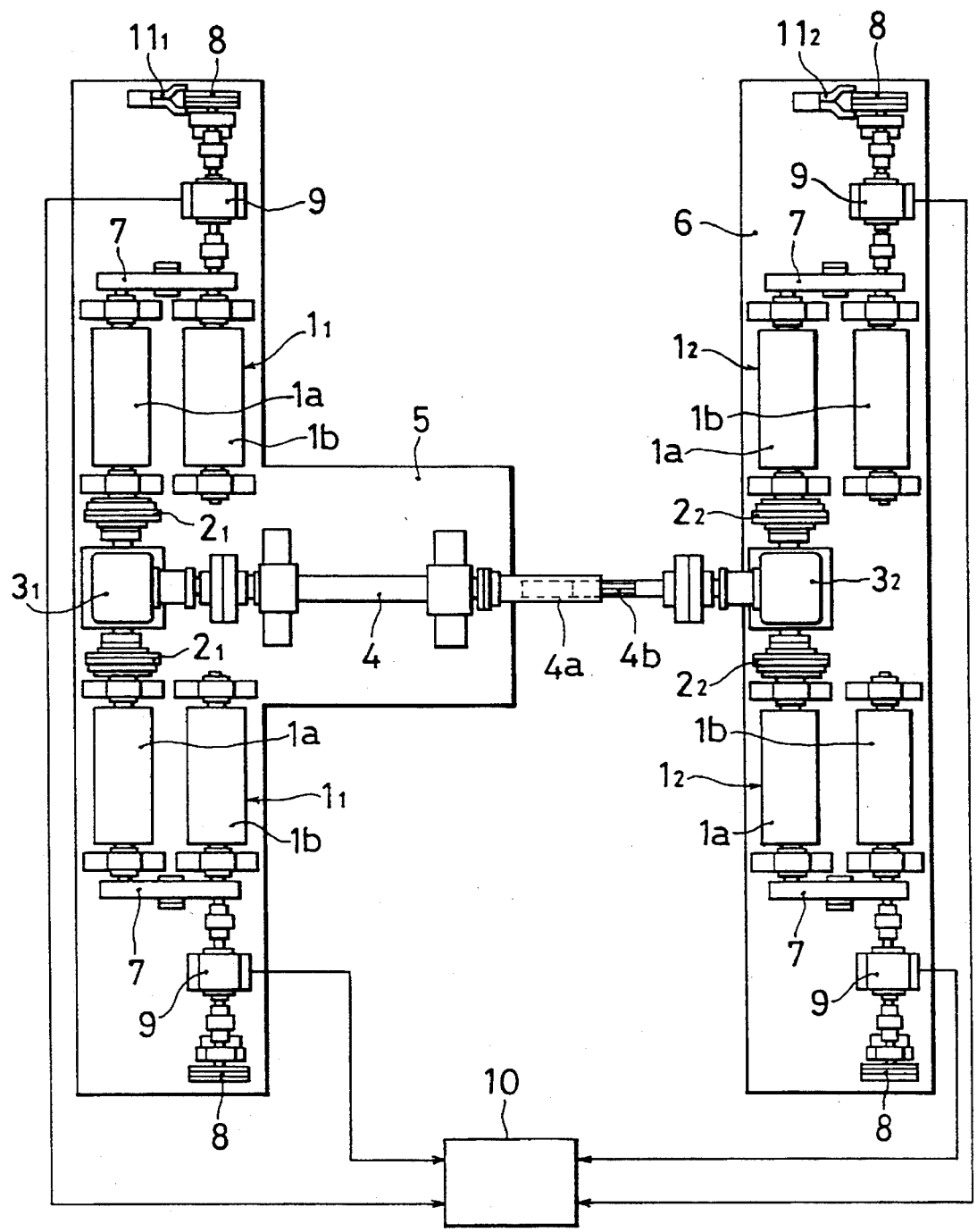
FIG. 1 is a plan view of an inspecting apparatus to be used in carrying out the present invention method.

FIG. 1 shows an inspecting apparatus for carrying out inspections of various control functions of a motorcar. The apparatus comprises a pair of right and left rolls $1_1$, $1_1$ for the front wheels of the motorcar and a pair of right and left rolls $1_2$, $1_2$ for the rear wheels of the motorcar. There are provided a gear box $3_1$ which connects the rolls $1_1$, $1_1$ via a respective clutch $2_1$ which is disposed between the gear box $3_1$ and the right and left rolls $1_1$, $1_1$, and a gear box $3_2$ which connects the rolls $1_2$, $1_2$ via a respective clutch $2_2$ which is disposed between the gear box $3_2$ and the right and left rolls $1_2$, $1_2$. Both of these gear boxes $3_1$, $3_2$ are connected together by a connecting shaft 4. It is thus so arranged that, when the motorcar is driven with its wheels mounted on the above-described respective rolls, the rear wheels as the driven wheels, in the case of a front-wheeldrive motorcar, are caused to be rotated via rolls $1_1$, clutches $2_1$, gear box $3_1$, connecting shaft 4, gear box $3_2$, clutches $2_2$ and rolls $2_2$. In the case where the rear wheels are driving wheels, the front wheels are caused to be rotated via the route which is opposite to the above-described one.

The rolls $1_1$, $1_1$ for the front wheels are mounted on a stationary table 5 and the rolls $1_2$, $1_2$ for the rear wheels are mounted on a sliding table 6 which is slidably movable back and forth. The rear portion of the connecting shaft 4 is made in a telescopic construction comprising a sleeve 4a and a spline shaft 4b which is fitted into the sleeve 4a. Therefore, the distance between the rolls $1_1$ for the front wheels and the rolls $1_2$ for the rear wheels is arranged to be adjustable depending on the wheel base.

Each of the above-described rolls $1_1$, $1_2$ is made up of a pair of front and rear split rolls 1a, 1b which are connected via a belt 7 so as to be rotatable synchronously. A flywheel 8 is connected to the rear-side split roll 1b of the respective rolls $1_1$, $1_2$, and a detecting means 9 having a rotational speed sensor and a torquemeter is respectively disposed between the split roll 1b and the flywheel 8. Signals from the detecting means 9 are input to a monitor apparatus 10 comprising a microcomputer so that the inspection of various control functions as described hereinbelow can be carried out.

Further, there are provided braking means $11_1$, $11_2$ to at least one of the pair of rolls $1_1$, $1_1$ for the front wheels and to at least one of the pair of rolls $1_2$, $1_2$ for the rear wheels. Each of the braking means $11_1$, $11_2$ comprises a brake to apply a braking force to the respective flywheel 8.

Figure 2:
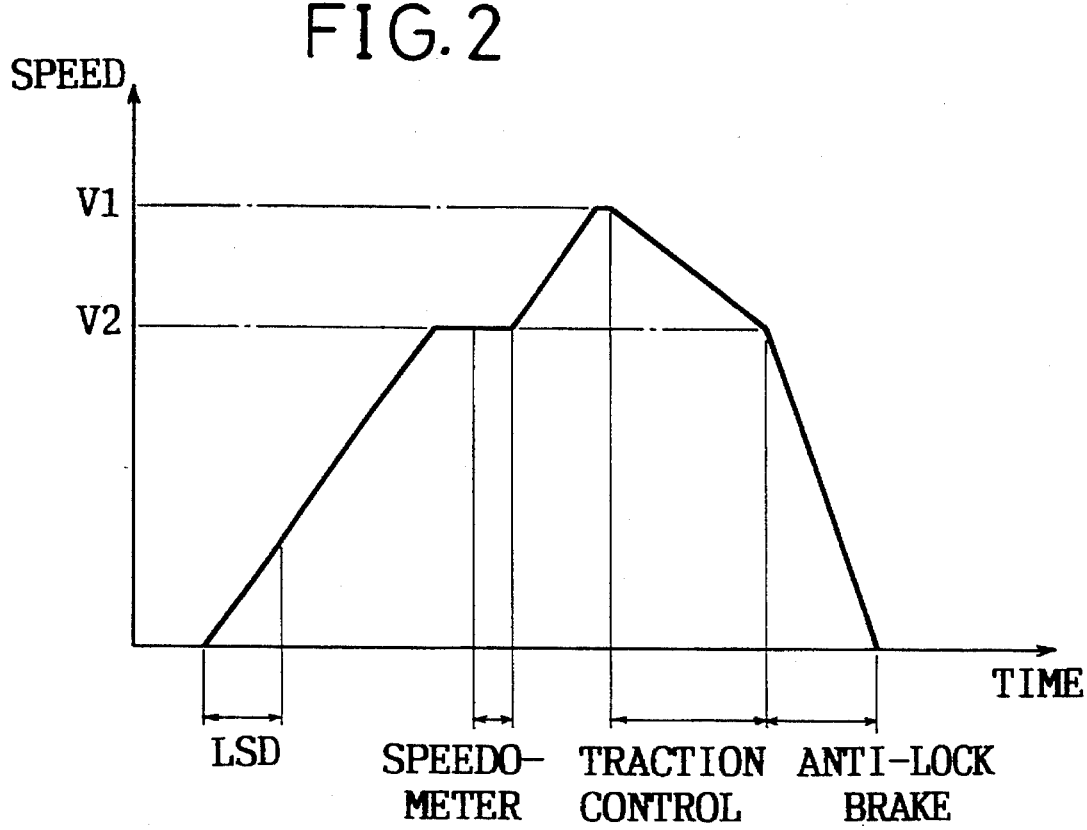
FIG. 2 is a diagram showing one example of the inspecting procedure according to the present invention method.

In carrying out the inspection of the functions of the motorcar, a starting and accelerating operation is performed in a condition in which each of the wheels is mounted on each of the respective rolls. As shown in FIG. 2, the inspection of the LSD is first carried out in the accelerating process. Then, in the midst of the accelerating process, running at a constant speed is once attained to inspect a speedometer of the motorcar. Thereafter, when a first set speed V1 has been attained, the acceleration is stopped to carry out the inspection of the traction control system. Then, when the motorcar has been decelerated to a second set speed V2, the inspection of the anti-lock brake system is carried out. Detailed explanations will now be made hereinbelow about the respective examinations of the LSD, traction control system and anti-lock brake system in an example of a front-wheeldrive motorcar.

(I) Inspection of LSD

The LSD is incorporated between the right and left front wheels which function as the driving wheels. The clutches $2_1$, $2_1$ for the right and left front wheels $1_1$, $1_1$ are disengaged and one of the rolls $1_1$ for the front wheels is braked by the braking means $11_1$. In this condition, starting and accelerating operation of the motorcar is carried out. If the LSD functions normally, there will be generated a limited slip differential torque corresponding to the difference in rotational speed between the right and left front wheels. The engine torque is evenly distributed to the right and left front wheels by means of the differential gear of the LSD. Let the distributed torque be called T and the limited slip differential torque Ts. Then, a torque T+Ts will be transmitted to the front wheel of lower rotational speed on one of the rolls $1_1$ that is braked, and a torque T−Ts will be transmitted to the front wheel of higher rotational speed on the other $1_1$ of the rolls. The value Ts can be obtained by deducting the torque of the front wheel of the higher rotational speed from the torque of the front wheel of the lower rotational speed. The torque of the front wheel of the lower rotational speed can be measured as the torque which acts on the above-described one $1_1$ of the rolls on which the front wheel of the lower rotational speed is mounted. The torque of the front wheel of the higher rotational speed can be obtained by multiplying the acceleration of the above-described other $1_1$ of the rolls on which the above-described wheel of the higher rotational speed is mounted, by the moment of inertia of the front wheel of the higher rotational speed inclusive of the above-described roll $1_1$. Then, the difference in rotational speed between the rolls $1_1$, $1_1$ for the right and left front wheels is measured, and also the limited slip differential torque actually generated is calculated by measuring the torque which acts on the one $1_1$ of the rolls to be braked and the acceleration of the other $1_1$ of the rolls. It is judged whether the LSD is acceptable or not by comparing a standard value of the limited slip differential torque which is generated at the measured difference in rotational speed and the actual limited slip differential torque.

After the inspection has been finished, the actuation of the braking means $11_1$ is released, all the clutches $2_1$, $2_2$ are engaged, and the acceleration of the motorcar is continued.

(II) Inspection of Traction Control System

Figure 3:
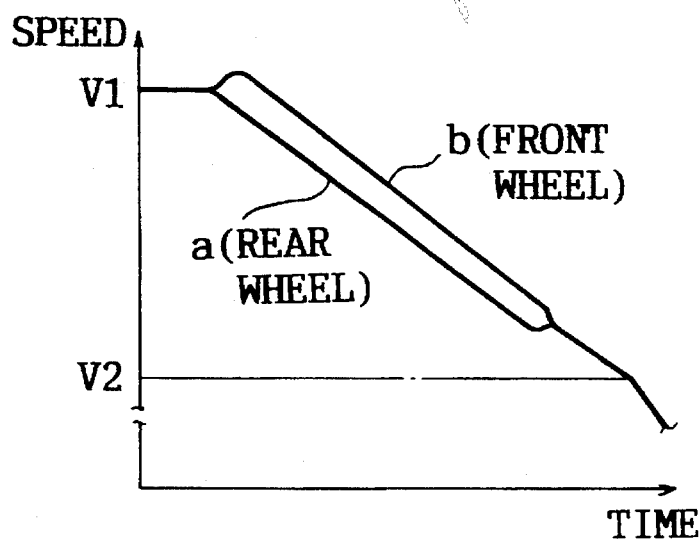
FIG. 3 is a diagram showing the changes in rotation of the front and rear wheels due to traction control.

After the inspection of the speedometer, the motorcar is further accelerated. When all of the rolls $1_1$, $1_2$ have reached a first set speed V1, an instruction from the monitor apparatus 10 is given to the driver of the motorcar to stop further acceleration. At the same time, the clutches $2_1$ for the rolls for the front wheels are disengaged to make the rolls $1_1$ for the front wheels and the rolls $1_2$ for the rear wheels rotate independent of each other. Also, the braking means $11_2$ for the rolls $1_2$ for the rear wheels are operated to decelerate the rolls $1_2$ as represented by curve "a" in FIG. 3. According to this operation, a difference in rotational speed is generated between the front wheels and the rear wheels and consequently the traction control system is actuated. The output of the engine is therefore controlled such that the ratio of slippage $\lambda=(VF-VR)/VF$ to be obtained by the rotational speed VF of the front wheels and the rotational speed VR of the rear wheels is maintained at a predetermined set value $\lambda S$. The front wheels and, in other words, the rolls $1_1$ for the front wheels are thus decelerated as shown by the curve "b" in FIG. 3 in a predetermined correlation to the deceleration of the rolls $1_2$ for the rear wheels.

Then the ratio of slippage $\lambda$ is calculated in the monitor apparatus 10 based on the rotational speed signals from the respective detecting means 9. It is thereby judged whether or not the traction control system is acceptable by whether or not the ratio of slippage $\lambda$ at the time of deceleration of the rolls $1_2$ for the rear wheels falls within a predetermined allowable range based on the set value $\lambda S$.

After the inspection, the operation of the braking means $11_2$ is released and, at the same time, the clutches $2_1$ for the rolls $1_1$ for the front wheels are engaged (the clutches $2_2$ for the rolls $1_2$ for the rear wheels have already been engaged). The rotational force of the rolls $1_1$ for the front wheels is thus transmitted to the rolls $1_2$ for the rear wheels to make the rotational speed of the front wheels to coincide with that of the rear wheels. In this condition, the motorcar is decelerated down to a second set speed V2.

(III) Inspection of Anti-Lock Brake System

When the rotational speeds of all of the rolls $1_1$, $1_2$ have been decelerated down to the second set speed V2, all of the clutches $2_1$, $2_2$ are disengaged. In this condition, a brake pedal is depressed to judge, as described in detail hereinbelow, whether or not the anti-lock brake system is acceptable based on the signals from the torquemeters provided in the detecting means for the respective rolls $1_1$, $1_2$.

FIGS. 4a, 4b, 4c and 4d show changes in the torque T to be detected by the torquemeters, changes in the rotational speed V of the wheels, changes in the deceleration v of the wheels, and changes in the braking pressure P when the anti-lock brake system operates normally. The anti-lock brake system functions in the following manner. Namely, when the deceleration of the wheels is above a predetermined set value vs, the increase in the braking pressure is stopped. When the rotational speed V of the wheels is below a standard speed Vs which is determined by predetermined deceleration characteristics, the braking pressure is decreased. When the deceleration v is below the set value vs, the decrease in the braking pressure is stopped. When the rotational speed V of the wheels has exceeded the standard speed, the braking pressure is increased. Thereafter, the above-described operations are repeated. The torque T varies with the deceleration v, and there appear, in the wave forms thereof, peaks which correspond to the increasing and decreasing controls of the braking pressure. At the time when the rolls are stopped, the elastic energies stored in the inertia system comprising the wheels, rolls and flywheels are released and, consequently, the deceleration v and the torque T once lower below zero level.

Figure 4A:
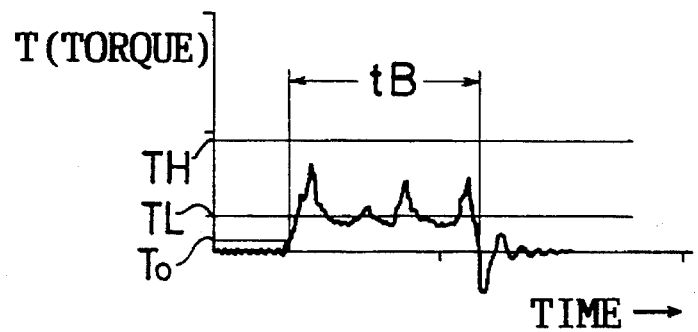
FIGS. 4a, 4b, 4c and 4d are diagrams showing changes in torque waves, rotational speeds of wheels, wheel deceleration and braking pressure, respectively, when anti-lock brake system is operated.
Figure 4B:
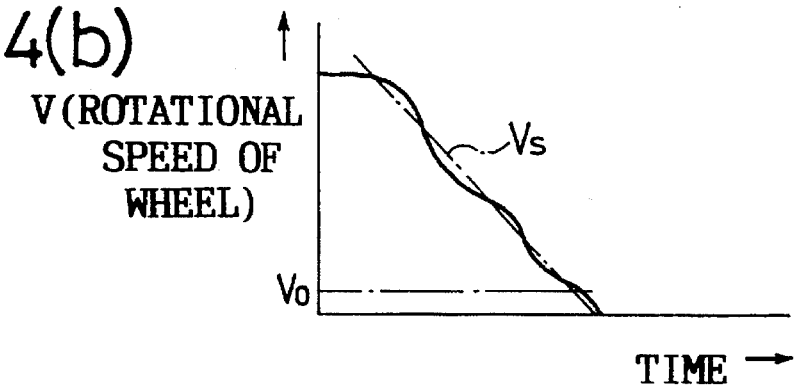
Figure 4C:
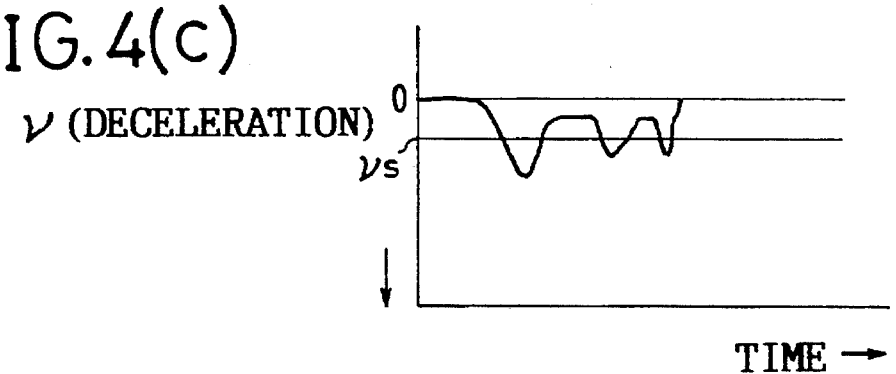
Figure 4D:
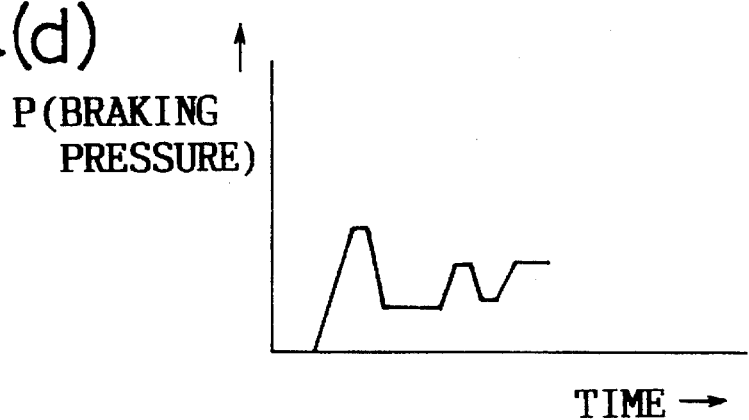

In the monitor apparatus 10, the time required from the time when the torque T has exceeded a threshold level $T_0$ to the time when the torque T has lowered below zero level, is calculated as the braking time tB. The number and value of peaks which occurred within this braking time tB are also calculated. It is thereafter judged whether or not the anti-lock brake system is acceptable by whether or not the braking time tB and the number and value of the peaks respectively fall within respective allowable ranges. In FIG. 4a, TL and TH denote a lower limit and an upper limit, respectively, of the allowable range of the peak value.

As described above, the various control functions of the LSD, traction control system and anti-lock brake system can be effectively inspected in a continuous manner during the time from starting to stopping of the motorcar.

In the above-described embodiment, it is so arranged that, in the inspection of the traction control system, the rolls $1_2$ for the rear wheels as the driven wheels are forcibly decelerated by means of the braking means $11_2$. However, the following arrangement may also be employed. Namely, the clutches $2_1$ for the rolls $1_1$ for the front wheels and/or the clutches $2_2$ for the rolls for the rear wheels are disengaged so that the rolls $1_2$ for the rear wheels are naturally decelerated without operating the braking means $11_2$.

Further, the following is also possible. Namely, braking operation is performed right after the inspection of the traction control system and, when each of the rolls $1_1$, $1_2$ has respectively been decelerated down to the second set speed, sampling of the data on the torque of the respective rolls is started in sequence to carry out the inspection of the anti-lock brake system.

Normally, the brakes for the front wheels are so set as to obtain a stronger braking force than that of the brakes for the rear wheels. Therefore, the inertia weight of the rolls $1_1$ for the front wheels is set larger than that of the rolls for the rear wheels to prevent the front wheels from stopping before the braking pressure is increased after the decrease in the braking pressure of the brakes for the front wheels. When the clutches $2_1$ for the rolls $1_1$ for the front wheels are disengaged in carrying out the inspection of the traction control system, the transmission of the power to the rolls for the rear wheels is stopped to thereby reduce the driving load of the engine and, consequently, the rotational speed of the front wheels is once increased. If the inertia weight of the rolls $1_1$ for the front wheels is large, it takes time for the front wheels to be decelerated even if the engine output is lowered through the normal operation of the traction control system. In order to eliminate this kind of disadvantage, the following measures may be taken. Namely, a braking means $11_1$ is provided in each of the rolls $1_1$, $1_1$ for the right and left front wheels. Thus, the increase in the rotational speed of the front wheels is restrained by temporarily operating the braking means $11_1$ when the clutches $2_1$ are disengaged. Or else, such a member like the flywheel 8 as will contribute to the increase in the inertia weight of the rolls $1_1$ for the front wheels is connected to the respective roll $1_1$ via a clutch to make variable the inertia weight of the rolls $1_1$ for the front wheels. In this manner, the inertia weight of the rolls $1_1$ for the front wheels may be reduced at the time of inspecting the traction control system.

By the way, in a 4wheel-drive motorcar, as disclosed in Japanese Published Unexamined Patent Application No. 233124/1989, there has been developed a system in which the torque is distributed to the right and left rear wheels via an electronic torque distributing apparatus to improve the cornering performance by accelerating the outer rear wheel at the time of turning (or cornering).

Figure 5:
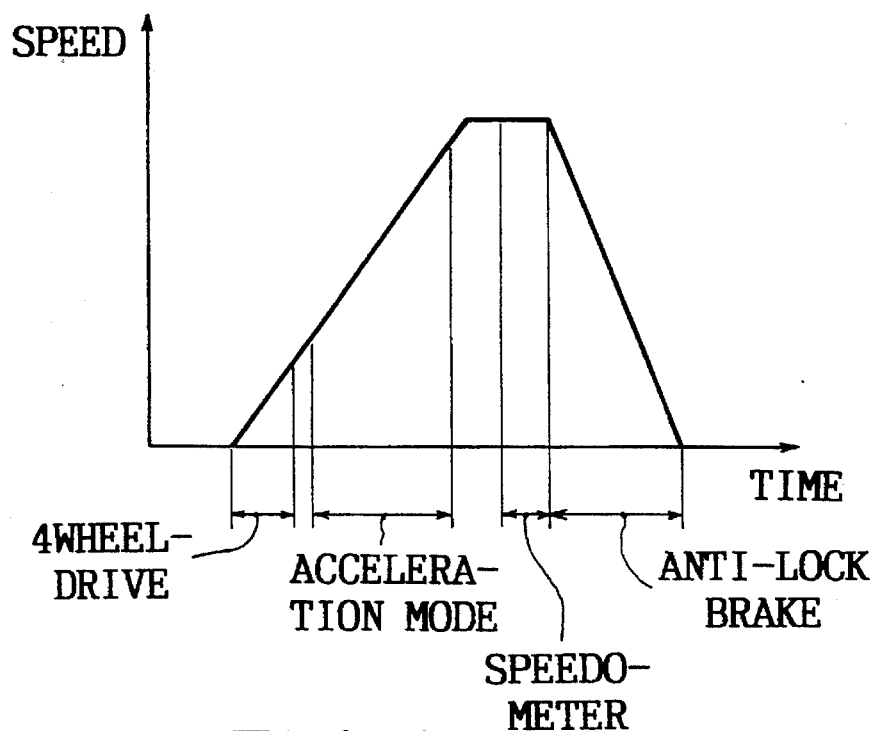
FIG. 5 is a diagram showing the inspecting procedure according to another example of the present invention method.
Figure 6:
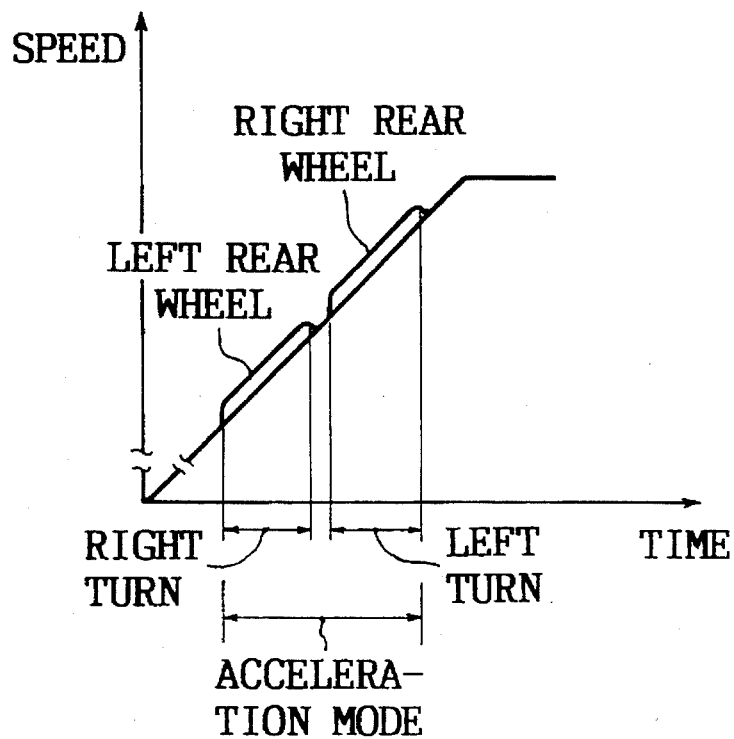
FIG. 6 is a diagram showing changes in rotation of the rear wheels due to rear wheel accelerating mode mechanism at the time of turning.

In the inspection of this kind of 4wheel-drive motorcar, the following procedure may be followed. Namely, starting and accelerating operation is performed in a condition in which the clutches $2_1$, $2_2$ for the respective rolls $1_1$, $1_2$ are all disengaged. As shown in FIG. 5, an inspection of the 4wheel-drive is first carried out to see whether or not the four wheels are driven normally, based on the rotational speed signals of the rolls $1_1$, $1_2$. Then, an accelerating mode inspection is carried out to see whether or not the acceleration of the outer rear wheel is performed at the time of cornering in the process of accelerating step. Thereafter, the motorcar is transferred to a condition of running at a constant speed to inspect the speedometer. Then, the brake pedal is depressed to carry out the inspection of the anti-lock brake system in the same manner as described above.

In the accelerating mode inspection, pseudo steering signals for right turn and left turn are input from outside to a controller for torque distribution apparatus which is mounted on the motorcar. If the accelerating mode functions are operating normally, the rotational speed of the left rear wheel at the time of inputting the right turn signals and the rotational speed of the right rear wheel at the time of inputting the left turn signals are, respectively, accelerated by a predetermined rate relative to the rotational speeds of the other respective wheels. In this manner, it can be judged whether or not the accelerating mode functions are acceptable by seeing whether or not the accelerating degree, relative to the speed of the rolls $1_2$ for the respective rear wheels, of each of the rolls $1_2$ for the rear wheels at the time of inputting the steering signals falls within an allowable range.

It is readily apparent that the above-described method of inspecting a plurality of control functions of a motorcar meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of inspecting a plurality of control functions of a differential apparatus with a limited slip differential, a traction control system and an anti-lock brake system of a motorcar having four wheels in a condition in which the motorcar is driven while each of said four wheels is, respectively, mounted on one set of four sets of connected rolls provided in an inspection apparatus, said method comprising the steps of:

inspecting the differential apparatus with the limited slip differential mechanism by disconnecting at least one set of said four sets of rolls upon which a wheel connected to said differential mechanism to be inspected is mounted and simulating operating conditions of said differential apparatus in an accelerating process of starting and accelerating operation of the motorcar;

then reconnecting said at least one set of said four sets of rolls disconnected for said inspecting of said differential mechanism and inspecting said traction control system by disconnecting at least one set of said four sets of rolls upon which a wheel connected to said traction control system to be inspected is mounted and simulating operating conditions of the traction control system at a time when a preset drive Speed of said wheels has been reached; and, thereafter, reconnecting said at least one set of rolls of said four sets of rolls disconnected for said inspection of said traction control system, disconnecting all of said four sets of rolls at a time when a drive speed of the wheels has been decreased to a second set speed and inspecting the anti-locking brake system on the wheels mounted on said disconnected four sets of rolls by operating a brake of the motorcar.

2. A method of inspecting a plurality of control functions on a motorcar having four wheels, said inspection being carried out by running the motor of the motorcar while each wheel of all four wheels thereof is respectively mounted on one set of four sets of rolls provided on an inspection apparatus, comprising the steps of:

grouping said control functions into a first group having a function of accelerating at least one wheel of said four wheels and a second group, other than a brake system, having a function of decelerating at least one wheel of said four wheels;

thereafter inspecting a first control function which belongs to said first group during a process of accelerating the motorcar, while one set of rolls on which a wheel to be accelerated by the first control function is mounted is disconnected from the remaining set of rolls with the remaining of said wheels mounted thereon so that said disconnected one set of rolls is freely rotatable, said disconnected one set of rolls being reconnected to said remaining set of rolls during the step of accelerating the motorcar after said step of inspecting the control function belonging to said first group and back to a state in which all sets of rolls are connected together;

thereafter inspecting a second control function which belongs to said second group in a succeeding process of decelerating the motorcar, while one set of rolls on which a wheel to be decelerated by the second control function is mounted is disconnected from the remaining sets of rolls with the remaining of said wheels mounted thereon so that said disconnected one set of rolls with said wheel to be decelerated by said second control function mounted thereon is freely rotatable; and thereafter inspecting the brake system while each set of rolls is disconnected from the other sets of rolls.

3. A method of inspecting a plurality of control functions of a motorcar according to claim 2, wherein said motorcar is a 4wheel-drive motorcar which has a function of accelerating an outer rear wheel at a time of turning of said motorcar, and wherein said first group includes said function of so accelerating said outer rear wheel.

* * * * *